May 19, 1953     J. E. CALLAHAN     2,638,676

SHAFT ALIGNMENT DEVICE

Filed April 21, 1949

INVENTOR
JOHN E. CALLAHAN

BY

ATTORNEY

Patented May 19, 1953

2,638,676

UNITED STATES PATENT OFFICE 2,638,676

SHAFT ALIGNMENT DEVICE

John E. Callahan, Medford, Mass.

Application April 21, 1949, Serial No. 88,873

6 Claims. (Cl. 33—84)

(Granted under Title 35, U. S. Code (1952), sec. 266)

This invention relates to the alignment of mechanical elements and more particularly to an apparatus and method for the alignment of rotating shafts preparatory to the coupling thereof.

In general, when it is desired to couple two mechanical elements together, perfect axial alignment of the two elements obviously is the most desirable condition. Poor alignment of coupled rotating shafts, for example, results in numerous disadvantages such as excessive and uneven bearing wear, sprung shafts, destructive vibration, and even failure of the device driving the shaft.

Heretofore, attainment of good alignment between rotating shafts to be coupled required tedious and painstaking labor. The method was essentially one of trial and error requiring the use of levels, gauges, squares, and measuring instruments. Considerable time was expended, and the results of the trials required checking by means of test runs. Beyond these objections was the further possibility of damage to shafts, bearings, or equipment if poor alignment still existed during test runs.

Therefore, it is the general object of the present invention to overcome the foregoing difficulties.

It is another object of the present invention to effect a saving in labor in accomplishing perfect alignment of coupled mechanisms.

A more specific object of the present invention is to provide a relatively simple device for use in accurately and quickly aligning shafts which are to be coupled together.

In general, the present invention resides in apparatus consisting of two matched, self-centering members designed for temporary attachment to the ends of a pair of rotating shafts to be coupled. The shafts may be of large or small size and need not be of the same size, since suitable bushings may be used on the smaller shaft of the pair when required. The members are slidably attached to the shaft ends and then may be brought into contact with each other in the same manner as would coupling flanges. Any misalignment, either lateral or vertical then becomes visually apparent. The degree of misalignment may also be estimated visually. Then, by the addition or removal of shims for vertical correction, and/or by shifting the position of the equipment for lateral correction, good alignment may be achieved. Further perfection of the alignment is obtainable by using a straight edge or fine feeler gauge. A final check for extreme accuracy in alignment can be made by the insertion of the alignment pin of the invention in the holes provided in the two members. Any degree of accuracy is obtainable by a suitable choice of relative sizes of the holes in the members and the alignment pin. For a better understanding of the invention, together with other and further objects, features, and advantages, reference should be made to the following description which is to be read in connection with the accompanying drawings in which:

Figure 1:
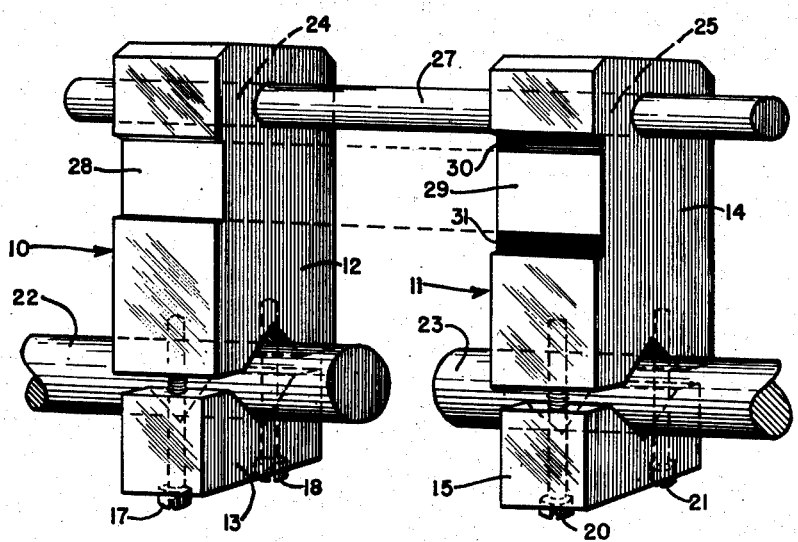
Fig. 1 is a perspective view of a preferred embodiment of the invention.

The embodiment shown in Fig. 1 includes a first matching member 10 and a second matching member 11. Member 10 is separable into two portions 12 and 13 and member 11 is similarly separable into portions 14 and 15. Portions 12 and 14 have identical V-grooves cut in their bottom surfaces and portions 14 and 15 have similar V-grooves. Portion 13 is attached to portion 12 by means of screws 17 and 18, and portion 15 is attached to portion 14 by means of screws 20 and 21. Thus the two portions of each member may be attached to shafts to be aligned, for example, shafts 22 and 23, members 10 and 11 being self-centering for a large range of shaft sizes by the action of the V-grooves. A hole 24 of suitable diameter is provided in member 10 and a hole 25 of identical diameter is provided in member 11. A carefully machined alignment pin 27 is adapted for insertion through holes 24 and 25. A flat groove 28 is cut in member 10, and a wider groove 29 is cut in member 11. Two series of measuring lines 30 and 31 are engraved in groove 29 such that the distance between the lowermost line of series 30 and the uppermost line of series 31 is equal to the width of groove 28.

Figure 2:
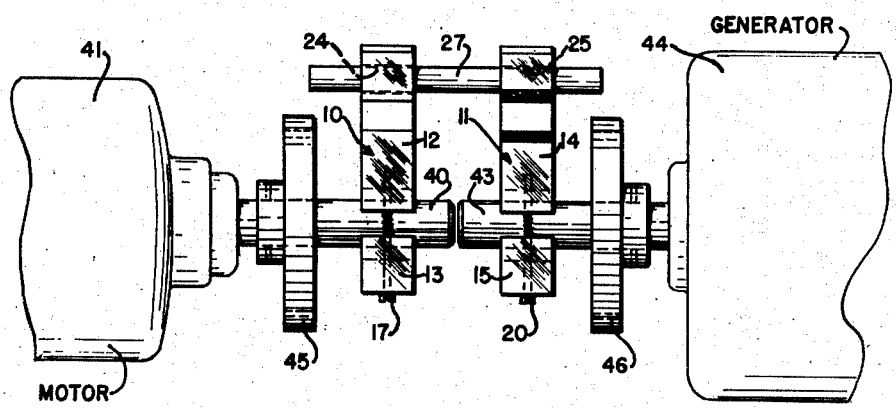
Fig. 2 is an elevation view illustrating a typical use of the invention in shaft alignment.

A typical use of the apparatus of the invention is illustrated in Fig. 2. Here, it is desired to couple the shaft 40 of the motor 41 to the shaft 43 of the generator 44. Coupling flanges 45 and 46 are loosened on their respective shafts and shifted axially toward the motor and generator respectively. Member 10 of the alignment device is secured to shaft 40 by assembling the portions 12 and 13 such that shaft 40 lies in the V-grooves of the member and screws 17 and 18 are tightened to secure member 10 in place. Member 11 is similarly assembled on shaft 43 and secured in place by means of screws 20 and 21. Members 10 and 11 are then brought into contact and appropriate shims are added or removed, or motor 41, or generator 44, or both, are moved until the edges of members 10 and 11 are in perfect register. A straight edge may be inserted in groove 28, and its position relative to lines 30 and 31 used to determine where shims must be added to obtain good alignment in the vertical plane. As a final step in assuring complete accuracy of alignment, pin 27 is inserted in holes 24 and 25. Fine adjustment may then be required before pin 27 fits freely through holes 24 and 25. After such adjustment is made, members 10 and 11 may be removed from shafts 40 and 43 by disassembling the portions of the members. The flanges 45 and 46 are then moved back to the ends of their respective shafts, secured to the shafts, and bolted together.

Without departing from the scope of the present invention, coupling flanges 45 and 46 may be adapted to aid in the alignment of the shafts to which they are secured. The same flanges, of course, would be used in the actual operation of the machinery. Additional holes for insertion of the alignment pin would be needed near the periphery of the flanges. For the flanges to be effective as an alignment device, the center shaft holes and the additional holes would require careful machining to close tolerances. To balance the flanges, holes of similar size to those for the alignment pin would be needed at a point diametrically opposite the alignment pin holes and at a similar distance from the center of the flanges.

Obviously, the degree of accuracy required in some cases will be considerably less than that required in others, as, for instance where flexible couplings are used. By a judicious choice of relative diameters of holes and pin, the degree of accuracy can be made as fine or as rough as is desired.

The invention described in the foregoing specification need not be limited to the details shown, which are considered to be illustrative of one form the invention may take.

The invention described herein may be manufactured and used by or for the Government of the United States of America for government purposes without the payment of any royalty thereon or therefor.

What is claimed is:

1. Apparatus for aligning a first shaft and a second shaft to be coupled comprising, first and second substantially similar members, each of said members comprising two separable portions, said separable portions of said first member being adapted for assembly on said first shaft, said separable portions of said second member being adapted for assembly on said second shaft, said first and second members being adapted for assembly in axially close position to each other so that the degree of alignment of said shafts and said members can be observed, each of said members having a rectangular indentation on matching sides thereof, the long sides of said rectangular indentations being parallel to the axes of the respective shafts upon assembly of said separable portions thereon, each of said members having openings therethrough remotely disposed from the point of separation of said portions, said openings being in register upon alignment of said members, and a pin of sectional dimension such that said pin may be slidably inserted in said openings.

2. Apparatus as in claim 1 wherein a series of lines are inscribed on the side of said second member parallel and adjacent to the long sides of said rectangular opening.

3. Apparatus for aligning a first shaft and a second shaft to be coupled comprising a pair of identical substantially rectangular blocks, each of the lower surfaces of said blocks having a centrally disposed 90° V-groove cut therein, said V-grooves extending substantially completely across said lower surfaces, a pair of smaller substantially rectangular identical blocks, each of the upper surfaces of said smaller blocks having a centrally disposed 90° V-groove cut therein, said V-grooves extending substantially completely across said upper surfaces, means for assembling a block of said first pair and a block of said second pair around the first of said shafts such that the periphery of said first shaft is in contact with the four surfaces of said V-grooves in said block of said first pair and said block of said second pair, means for similarly assembling the other block of said first pair and the other block of said second pair about the second of said shafts, said first and second blocks being adapted for assembly in axially close position to each other so that the degree of alignment of said shafts and said blocks can be observed, the blocks of said first pair having rectangular indentations in matching sides thereof at points remote from said shafts, the rectangular indentation on the second of the blocks of said first pair having a plurality of lines inscribed thereon parallel to the shaft associated with said second block of said first pair, said plurality of lines being adjacent to opposed sides of said rectangular indentation of said second block of said first pair of said rectangular indentation, the blocks of said first pair having openings therethrough in register upon alignment of said blocks of said first pair, said openings being remotely disposed from said shafts, and a pin adapted to be slidably inserted through said openings in said first pair of blocks.

4. Apparatus for axially aligning first and second adjustable, separated and substantially axial shafts comprising, first and second blocks, each of said blocks having a V-groove cut transversely across one end thereof, means for clamping one of said blocks to each of said shafts with the faces of said V-grooves in contact with the shaft to which the block is attached, said first and second blocks being clampable in axially close position to each other so that the degree of alignment of said shafts and said blocks can be observed, said first and second blocks having equal diameter openings therethrough with their axes oriented parallel to the vertex line of their respective V-groove, and displaced equal distances perpendicularly from the vertex line of their respective V-groove, each of said blocks having a slot in corresponding faces thereof having edges parallel to the axes of said openings for indicating the approximate relative alignment of said openings, and means for indicating the exact relative alignment of said openings, said last-mentioned means comprising a pin of diameter substantially equal to the diameter of each of the openings in said blocks.

5. Apparatus for axially aligning first and second adjustable, separated, and substantially axial shafts comprising, first and second aligning members of substantially rectangular cross-section, each of said members being separable into two sections, each of said sections having a V-groove formed therein, means for clamping said first and second members to said first and second shafts, respectively, such that each of the four surfaces formed by said V-grooves of each of said members is in contact with the surface of its respective shaft, said first and second members being clampable in axially close position to each other so that the degree of alignment of said shafts and said members can be observed, said first and second members having similar circular openings formed therein remote from said V-grooves, said openings having axes substantially parallel to the respective axes of the openings defined by said V-grooves, a pin of cross-sectional dimension substantially equal to those of said similar openings, each of said members also having rectangular indentations formed in a surface thereof at areas remote from said V-grooves, and means inscribed on one of said rectangular indentations for roughly indicating misalignment of said first and second shafts by comparison of the displacement of one of said indentations from the other, insertion of said pin in each of said similar openings providing an indication of true alignment of said first and second shafts.

6. Apparatus for axially aligning first and second adjustable, separated, and substantially axial shafts comprising, first and second aligning members of substantially rectangular cross-section, each of said members being separable into two sections, each of said sections having a V-groove formed therein, means for clamping said first and second members to said first and second shafts, respectively, such that each of the four surfaces formed by said V-grooves of each of said members is in contact with the surface of its respective shaft, said first and second members being clampable in axially close position to each other so that the degree of alignment of said shafts and said members can be observed, said first and second members having similar circular openings formed therein remote from said V-grooves, said openings having axes substantially parallel to the respective axes of the openings defined by said V-grooves, a pin of cross-sectional dimension substantially equal to those of said similar openings, said first member having a rectangular indentation formed in a surface thereof adjacent said circular opening in said first member, two sides of said rectangular indentation being parallel to the axis of said circular opening, said second member also having a rectangular indentation formed on a surface thereof adjacent said circular opening therein, said rectangular indentation in said second member having a double series of parallel lines inscribed therein parallel to two sides of said rectangular indentation and to the axis of the circular opening in said second member, one of said double series of parallel lines being adjacent one side of rectangular indentation and the other series being adjacent the opposite side thereof, the innermost lines of one series being spaced from the innermost lines of the other series by an amount equal to the spacing between the sides of the rectangular indentation parallel to the axis of the opening in said first member, whereby a straightedge may be placed in said rectangular indentation of said first member and extended to the rectangular indentation in said second member, said double series of lines providing a rough indication of alignment between said first and second shafts, and insertion of said pin in said circular openings providing a fine indication of alignment of said first and second shafts.

JOHN E. CALLAHAN.

References Cited in the file of this patent

UNITED STATES PATENTS

| Number | Name | Date |
|--------|------|------|
| 431,054 | Henderson | July 1, 1890 |
| 487,427 | Poole | Dec. 6, 1892 |
| 541,754 | Isgrig | June 25, 1895 |
| 651,024 | Thomas | June 5, 1900 |
| 685,455 | Kinkead | Oct. 29, 1901 |
| 807,085 | Newton | Dec. 12, 1905 |
| 2,258,386 | Heath | Oct. 7, 1941 |
| 2,451,720 | Davis | Oct. 19, 1948 |
| 2,516,854 | Christian | Aug. 1, 1950 |

FOREIGN PATENTS

| Number | Country | Date |
|--------|---------|------|
| 117,215 | Germany | Jan. 30, 1901 |